(12) United States Patent
Prucher

(10) Patent No.: US 10,075,035 B2
(45) Date of Patent: Sep. 11, 2018

(54) SEGMENTED DUAL RADIAL GAP BRUSHLESS PMDC MOTOR/GENERATOR

(71) Applicant: Bryan Prucher, Clarkston, MI (US)

(72) Inventor: Bryan Prucher, Clarkston, MI (US)

( * ) Notice: Subject to any disclaimer, the term of this patent is extended or adjusted under 35 U.S.C. 154(b) by 0 days.

(21) Appl. No.: 15/450,098

(22) Filed: Mar. 6, 2017

(65) Prior Publication Data

US 2017/0257005 A1    Sep. 7, 2017

Related U.S. Application Data

(60) Provisional application No. 62/303,734, filed on Mar. 4, 2016.

(51) Int. Cl.

| | |
|---|---|
| *H02K 1/27* | (2006.01) |
| *H02K 21/16* | (2006.01) |
| *H02K 21/22* | (2006.01) |
| *H02K 41/03* | (2006.01) |
| *H02K 3/52* | (2006.01) |
| *H02K 7/08* | (2006.01) |

(52) U.S. Cl.
CPC .......... *H02K 1/278* (2013.01); *H02K 1/2786* (2013.01); *H02K 3/522* (2013.01); *H02K 7/088* (2013.01); *H02K 21/16* (2013.01); *H02K 21/225* (2013.01); *H02K 41/031* (2013.01); *H02K 2201/03* (2013.01); *H02K 2201/15* (2013.01); *H02K 2203/06* (2013.01); *H02K 2203/09* (2013.01); *H02K 2213/09* (2013.01); *Y02E 10/72* (2013.01)

(58) Field of Classification Search
CPC ...... H02K 21/12; H02K 21/16; H02K 21/225; H02K 1/2793; H02K 1/278; H02K 1/2786; H02K 3/522
See application file for complete search history.

(56) References Cited

U.S. PATENT DOCUMENTS

| | | | | |
|---|---|---|---|---|
| 3,636,392 A | * | 1/1972 | Gerry | G01F 1/11 310/156.26 |
| 3,731,533 A | * | 5/1973 | Geery | G01F 1/11 324/163 |
| 4,731,554 A | * | 3/1988 | Hall | H02K 29/08 310/156.26 |

(Continued)

*Primary Examiner* — Sean Gugger
(74) *Attorney, Agent, or Firm* — The Weintraub Group, P.L.C.

(57) ABSTRACT

The present invention provides a module dual radial gap brushless, permanent magnet AC or DC (BLPMAC/BLP-MDC) rotary electrical motor/generator suitable for direct drive wind or other fluid medium driven turbines. The motor/generator includes a circular rotor ring of individual rotor segments and a circular stator ring of individual stator segments. Each rotor segment includes a plurality of magnet modules disposed therein and arranged in alternating magnetic plurality. The stator includes a plurality of stator induction modules nested within the rotating rotor. Each stator induction module includes a coil electrically connected to a phase bus bar and a common bus bar. In a first embodiment of the stator induction modules, the motor/generator has a pre-established, fixed gap between the magnets and the coils. In a second embodiment of the stator induction modules, the generator has a gap controlled by a self-calibrating mechanism that compensates for variations in dimensional tolerance and concentricity between the rotor and the stator.

15 Claims, 14 Drawing Sheets

(56) References Cited

U.S. PATENT DOCUMENTS

| | | | | |
|---|---|---|---|---|
| 5,625,241 | A * | 4/1997 | Ewing | H02K 21/12 310/152 |
| 6,762,525 | B1 * | 7/2004 | Maslov | H02K 1/182 310/112 |
| 2010/0007225 | A1 * | 1/2010 | Platon | H02K 1/14 310/45 |
| 2010/0327688 | A1 * | 12/2010 | Canini | H02K 1/14 310/91 |
| 2012/0262019 | A1 * | 10/2012 | Smith | H02K 1/2766 310/156.07 |
| 2018/0013323 | A1 * | 1/2018 | Woolmer | H02K 21/24 |

* cited by examiner

SEGMENTED DUAL RADIAL GAP BRUSHLESS PMDC MOTOR/GENERATOR

CROSS-REFERENCE TO RELATED APPLICATION

This application is a completion application which claims the priority benefit of co-pending U.S. Provisional Patent Application Ser. No. 62/303,734, filed Mar. 4, 2016, titled "Segmented Dual Radial Gap Brushless PMDC Motor/Generator," the entire disclosure of which, including the drawing, is hereby incorporated by reference.

BACKGROUND OF THE INVENTION

1. Field of the Invention

This invention relates generally to brushless, permanent magnet AC or DC rotary electrical motor/generators (BLPMAC/BLPMDC) machines used to convert a rotational mechanical power input into an electrical power output. More particularly, the present invention concerns modular BLPMAC/BLPMDC generators for use in direct drive applications. Even more particularly, the present invention relates to modular BLPMAC/BLPMDC motor/generators comprising individual modular segments for manufacturing with wind turbines.

2. Description of the Prior Art

As is known to those skilled in the art, a wind turbine generator employs a rotor that incorporates a series of blades designed to capture wind energy and transform it into rotational mechanical power that is coupled to an electrical generator for the purpose of producing renewable electric energy. The turbine rotors in larger wind turbine systems (1 megawatt and above) typically rotate at relatively low RPM's and produce high levels of torque.

The output power produced by an electrical generator is proportional to the rotational speed of the generator rotor, which is governed by the rotational speed of the turbine rotor blades relative to the wind velocity.

Conventional generators, regardless of the type, used in most large wind or other large, low RPM fluid medium driven applications, employ a gearbox positioned between and operatively connected to both a turbine rotor shaft and the generator. This is for the purpose of increasing, or "gearing-up," the rotational speed of the generator relative to that of the turbine that drives it in order to attain a rotational velocity suitable for the generation of the desired power.

The gearbox is the single most expensive component in a wind turbine system. Because of the loads imposed on it, it is also the component most likely to fail and, typically, generates the system's highest maintenance cost.

Brushless, permanent magnet DC (BLPMDC) generators are an advantageous option for use in a wind turbine system. Since they have only one moving part, i.e. the rotor. Also, BLPMDC generators have been shown to endow a system with a combination of high efficiency and relatively maintenance free operation. When employed in a direct drive application, they eliminate the need for a gear box.

Although there are substantial capital expense and maintenance cost benefits to be gained from eliminating the gearbox, there are also significant drawbacks. Power is produced in proportion to the rate at which the permanent magnets in the rotor move past the coils in the stator. This is a function of the rotational speed (RPM) in combination with the diameter of the generator. In a large wind turbine system, the generator, lacking the benefit of any intermediary gearing, will rotate at the same low RPM as the turbine blades. The speed at which the magnets in a BLPMDC system move past the generator stator coils at any specific RPM increases linearly in relation to the diameter of the motor.

Therefore, increasing the diameter of the generator can provide the velocity necessary to produce substantial amounts of power. However, the sheer size required of a directly driven BLPMDC generator with the capacity to produce power in excess of 1 megawatt has, in the past, eliminated this approach from consideration.

Furthermore, along with increased size comes a number of other ancillary issues, not the least of which is the problem associated with transporting a large diameter machine to a final, typically remote, site for installation. Because of this, direct drive BLPMDC generators have historically been considered unsuitable for high power use and, therefore, employed only in smaller, higher RPM, low power wind turbine applications.

As detailed below, the present invention mitigates and overcomes these drawbacks by providing a modular BLPMDC generator suitable for use in a direct drive application for the generation of renewable power well in excess of 1 megawatt.

SUMMARY OF THE INVENTION

The present invention provides a modular dual radial gap BLPMDC motor/generator suitable for direct drive wind or other fluid medium driven turbines. Preferably, the motor/generator hereof employs a dual radial gap architecture such as described in U.S. Pat. No. 8,247,943, the disclosure of which is hereby incorporated by reference.

The present invention, generally, comprises a large diameter, typically greater than 5 feet, two-component circular hoop structure. The first component comprises a circular rotor ring of operatively connected individual rotor segments. The second component comprises a circular stator ring of operatively connected individual stator segments.

Each rotor segment includes a rotor frame having a top wall and a pair of opposed sidewalls extending downwardly from and substantially perpendicular to opposite ends of the top wall. The top wall and the sidewalls define an interior rotor channel. Each rotor segment further includes a plurality of magnet modules mounted within the rotor channel and arranged in alternating magnetic polarity. Each magnet module includes a substantially U-shaped metal band having a bight section, a pair of legs extending downwardly from the bight section, and a pair of inwardly facing magnets being disposed on respective legs and positioned within the channel.

Each stator segment includes a stator frame including a base and a pair of opposed sidewalls extending upwardly from and substantially perpendicular to opposite ends of the base. The stator frame further includes a pair of shoulders extending inwardly from respective sidewalls. The base and the pair of sidewalls define an interior stator channel.

Each stator segment further includes a plurality of phase bus bars and at least one common bus bar disposed within the stator channel.

Each stator segment further includes a plurality of operatively connected stator induction modules being seated on the shoulder of the stator frame. Each stator induction module includes a coil having leads extending from opposing ends of the coil and at least one turn formed therebetween. Respective leads of each coil is electrically connected one phase bus bar and a common bus bar.

A molded polymer formed from a thermally, non-electrically conductive polymer at least partially encapsulates the coil.

In use, the stator is fixed to a base, centered to share the same axis and plane as the rotor, and positioned so that the stator induction modules are nested within the rotating rotor channel. The rotor rotates above the stationary stator such that the plurality of magnet modules encircles the stator induction modules and provides a dual air gap between the coils and the opposing magnets.

In a first embodiment of the stator induction modules, the motor/generator has a pre-established, fixed gap between the rotor magnets and the coils.

In a second embodiment of the stator induction modules, the generator has a gap controlled by a self-calibrating mechanism that compensates for variations in dimensional tolerance and concentricity between the rotor and the stator.

In a third embodiment, the rotor frame is a substantially T-shaped member having a plurality of longitudinal slots formed therein. Instead of the magnet modules described with respect to the above embodiments, a magnet is disposed within each one of the plurality of longitudinal slots and arranged in alternating magnetic polarity.

Here, the stator includes a plurality of stator induction modules similar to that described above. Additionally, each stator induction module includes a lamination stack formed from a magnetic permeable material having a bight section encircled by the coil and a pair of opposing legs extending upwardly from and substantially perpendicular to opposite ends of the bight section. Thus, the opposing legs of the lamination stack extend upwardly, thereby extending parallel to a respective magnet.

The modular/segmented design of the motor/generator permits assembling the individual modules into separate segmented rotor and stator sub-assemblies which can be packaged as a kit.

For a more complete understanding of the present invention, reference is made to the following detailed description and accompanying drawing. In the drawing, like reference characters refer to like parts throughout the several views, in which:

DESCRIPTION OF THE INVENTION

Figure 19:
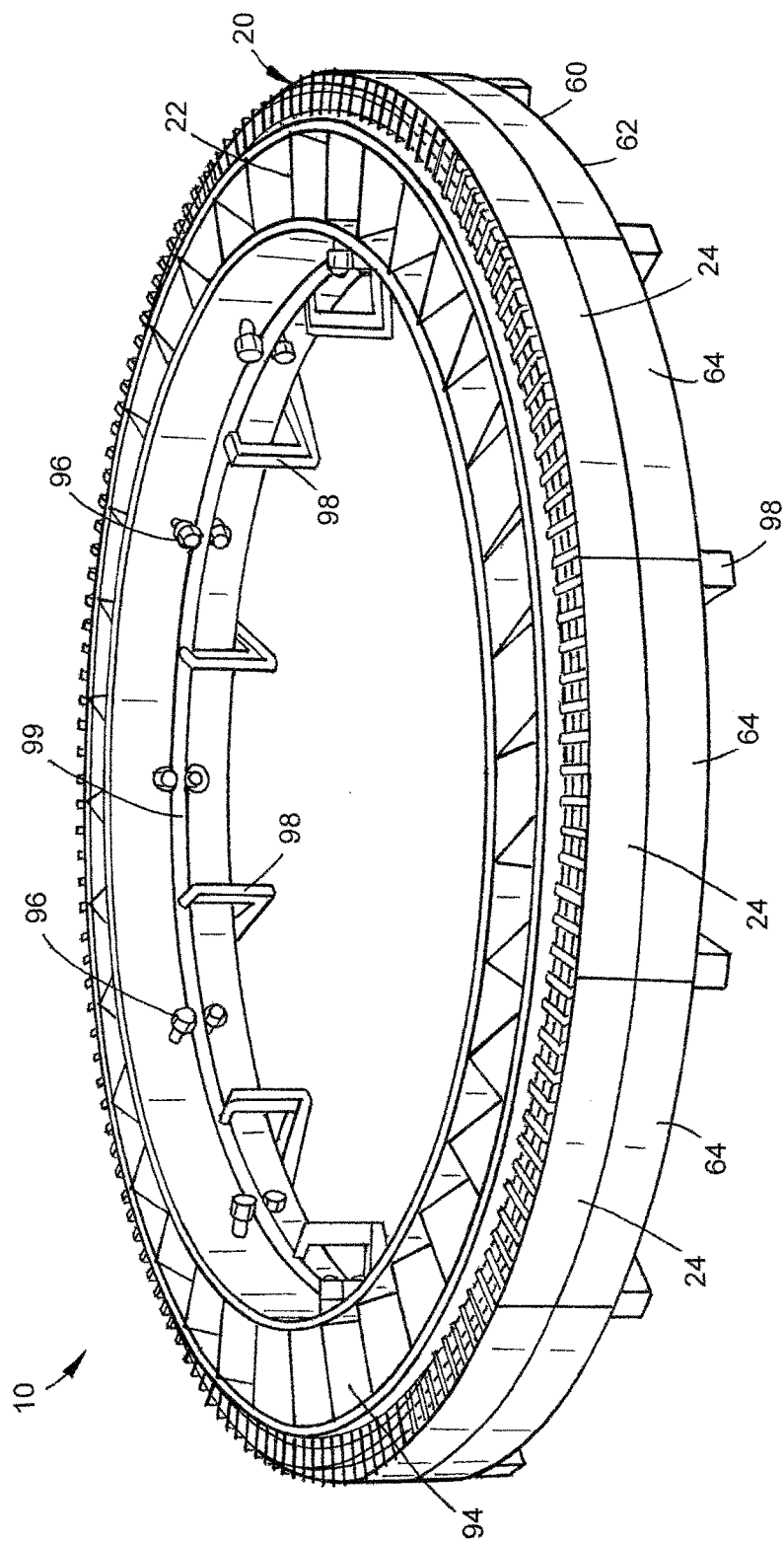
FIG. 19 is a perspective view of a wind driven turbine in combination with the motor/generator hereof.

Now, with reference to the drawing, and as shown in FIG. 19, the present invention provides a motor/generator, denoted at 10, generally comprising: (a) a rotor 20; and (b) a stator 60.

Figure 2:
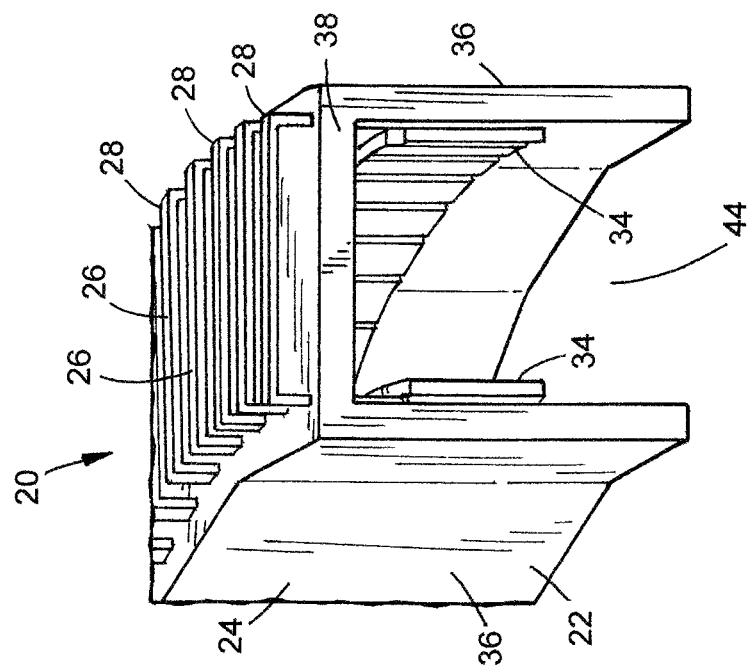
FIG. 2 is a partial perspective view showing a first embodiment of a rotor segment channel and an array of magnet modules disposed therewithin.
Figure 3:
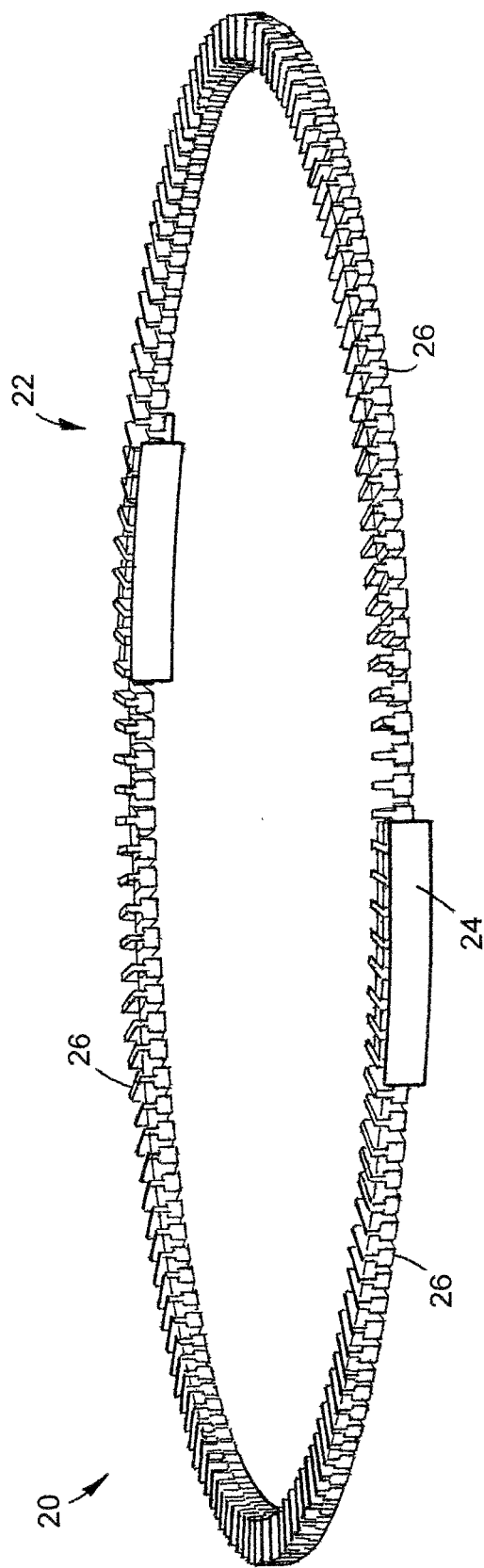
FIG. 3 is a perspective view showing the relationship between a segment of the rotor and a full array of magnet modules disposed in a multi-segment assembly.

As shown in FIGS. 2, 3, and 19, the rotor 20 includes an upper rotor ring 22 comprising a plurality of rotor segments 24 connected together in side-by-side in series, which house a plurality of magnet modules 26.

Figure 12:
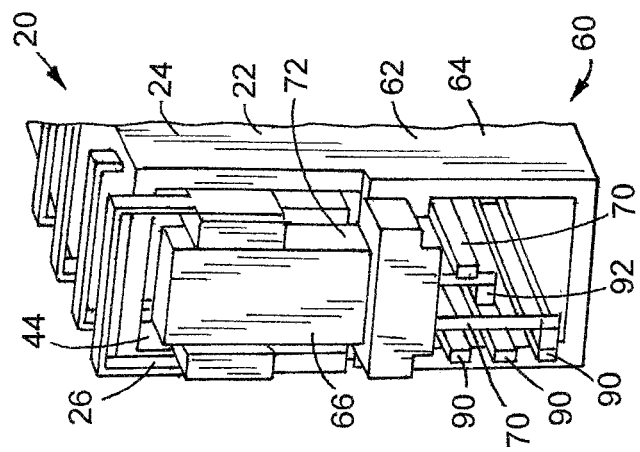
FIG. 12 is a cut-away view of the first embodiment of the stator induction module fully encapsulated and situated within the stator in accordance herewith.
Figure 11:
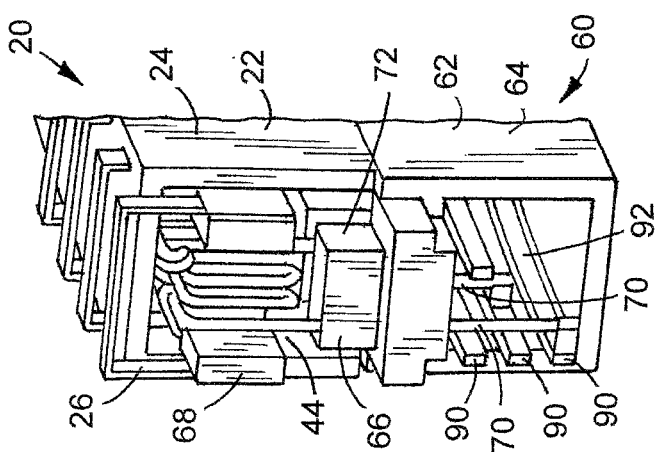
FIG. 11 is a cut-away view of a first embodiment of the stator induction module partially encapsulated and situated within a stator in accordance herewith.
Figure 15:
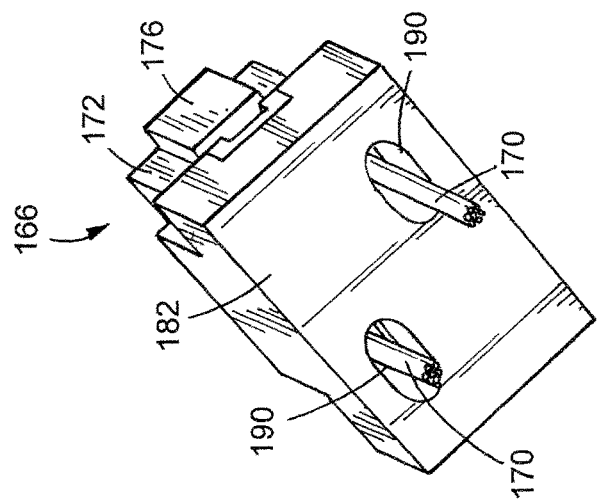
FIG. 15 is a bottom perspective view of the second embodiment of the stator induction module of FIG. 14 showing the end of the coil protruding through the bottom of the radial calibration guide carrier.
Figure 14:
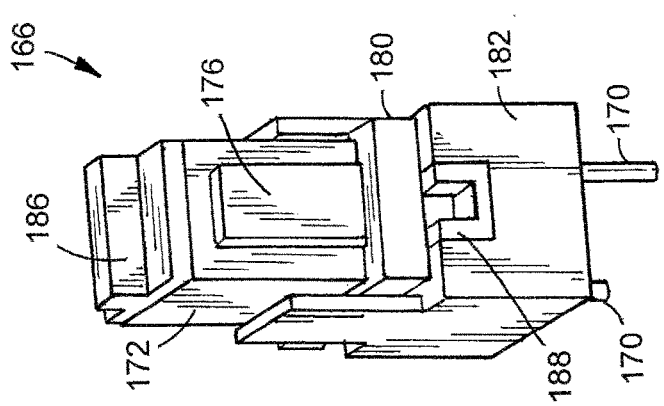
FIG. 14 is a perspective view of the second embodiment of the stator induction module seated within a radial calibration guide carrier in accordance herewith.
Figure 13:
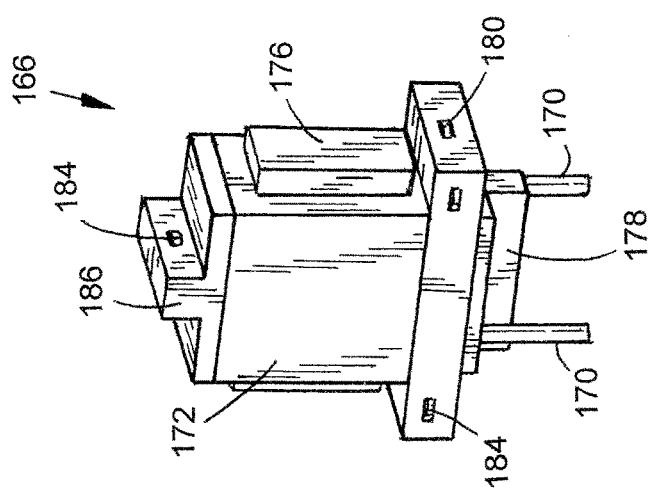
FIG. 13 is a perspective view of a second embodiment of the stator induction module including an upper radial calibration guide and a lower radial calibration guide that serve to calibrate and maintain the fixed dual air gaps between the stator induction modules and the magnet modules hereof.
Figure 18:
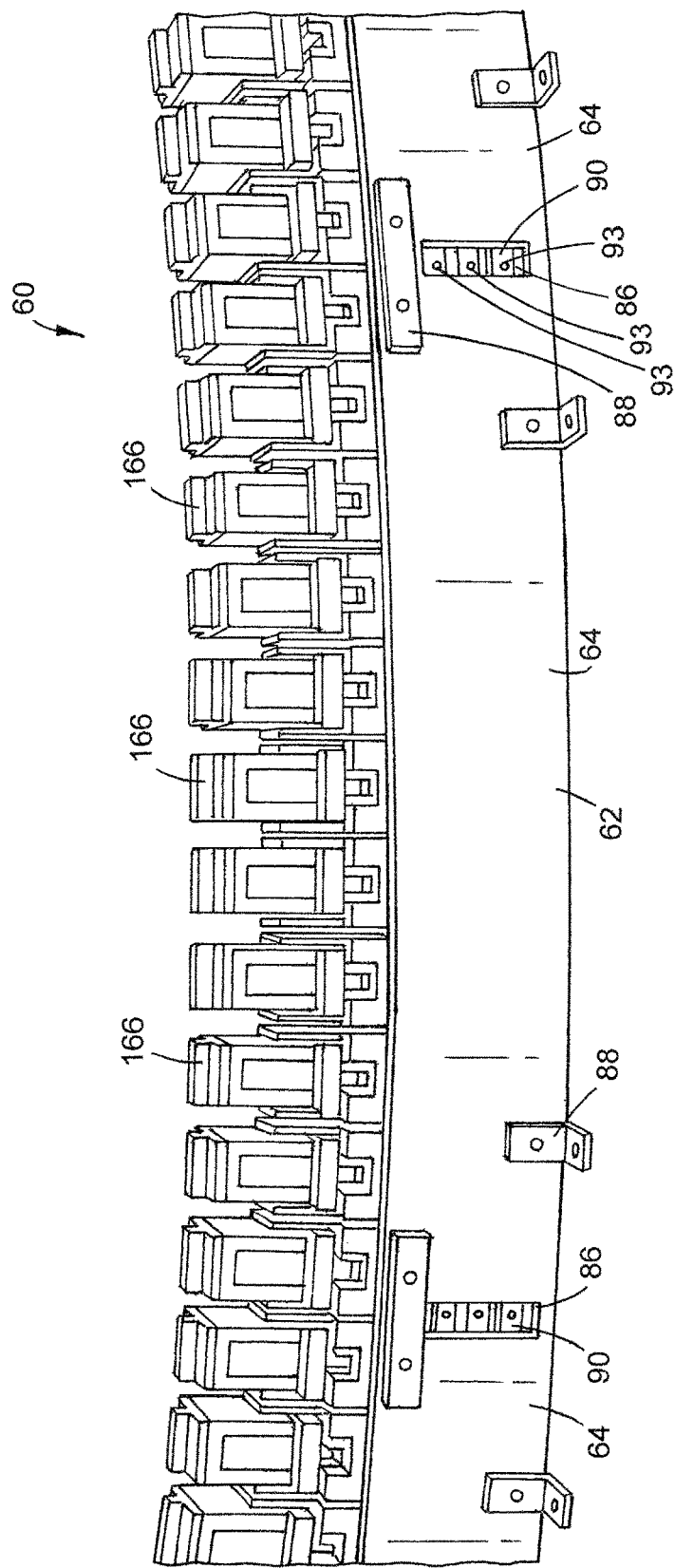
FIG. 18 is a side view of a plurality of stator segments in accordance herewith.

Referring to FIGS. 11, 12, and 18, the stator 60 includes a fixed lower stator ring 62 comprising a plurality of stator segments 64 connected together in side-by-side in series, which houses a plurality of stator induction modules 66. The rotor ring 22 is concentric with, and rotates around, the stator ring 62.

I. Rotor

With regard to the segmented rotor ring 22 shown in FIG. 3, as noted above, the rotor ring 22 comprises the plurality of rotor segments 24, each of which house the plurality of magnet modules 26 mounted therein, as described hereinbelow.

1. Magnet Modules

Figure 1:
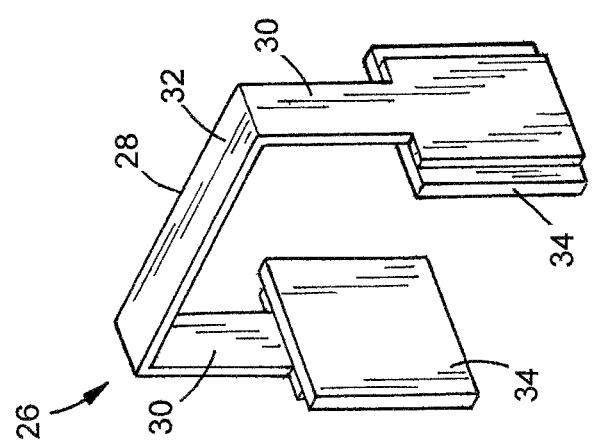
FIG. 1 is a perspective view showing a single magnet module in accordance herewith.

As shown in FIG. 1, each magnet module 26 is a substantially U-shaped member comprising a magnetically permeable metal band 28 having a bight section 32, a pair of legs 30 extending substantially perpendicular from opposite ends of the bight section 32, and a pair of opposing magnets 34.

Each leg 30 has a free end. The pair of opposing magnets 34 is operatively attached at respective free ends, one on each leg 30, such as by gluing or the like. The magnets 34 are positioned so that the North pole of one magnet is facing inward on one leg 30 and the South pole of the second magnet is facing inward on the other opposing leg 30. As noted, a permeable metal alloy such as a silicon steel serves as both a structural member and a flux path to connect the two opposing magnets 34 in a magnetic circuit. The metal band 28 and the magnets 34 cooperate to define the magnet module 26.

2. Rotor Segments

As shown in FIGS. 2 and 3, an array of the magnet modules 26 is arranged in a pattern of alternating magnetic polarity and are at least partially disposed within a grouping of rotor segments 24. The rotor segments 24, per se, are formed from a non-magnetically permeable material.

In a first embodiment of the rotor segments 24, each rotor segment 24 is a substantially, inverted U-shaped frame member having a top wall 38 and a pair of opposing sidewalls 36 extending substantially perpendicular from opposite ends of the top wall 38.

The top wall 38 and opposing sidewalls 36 of each rotor segment 24 define an interior rotor channel 44. The array of magnet modules 26 is attached to and secured in position to the rotor segments 24, within the rotor channel 44, by any suitable method, such as, for example, with mechanical fasteners (not shown) or may be molded in place into a rotor segment 24 made of a structural grade polymer, such as a glass-filled nylon or the like.

As shown in FIG. 19, when assembled, the rotor segments 24 are connected together side-by-side in series in a final ring shaped assembly, this forming the rotor ring 22. The rotor segments 24 may be operatively connected to one another individually by welding or with mechanical attachments. Alternatively, the rotor segments 24 may be operatively connected to one another by attaching them individually to a separate ring or cylindrical-shaped common frame.

Figure 4:
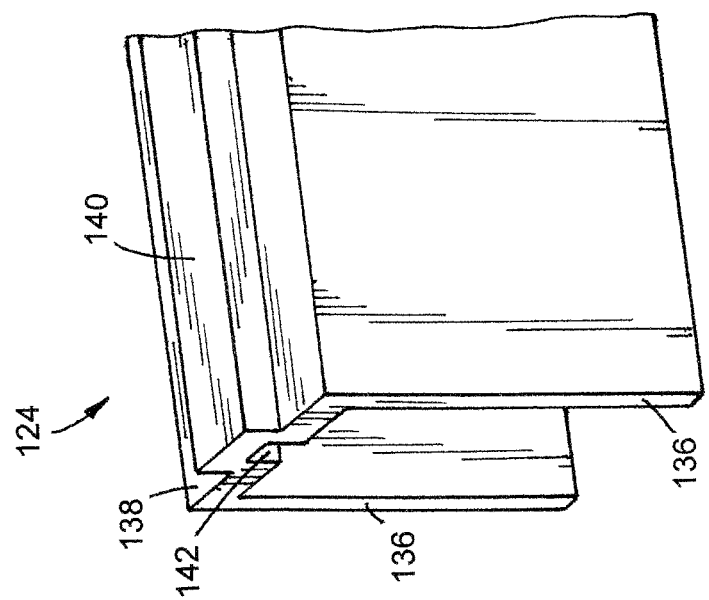
FIG. 4 is a partial perspective view of a second embodiment of a rotor segment.

Referring now to FIG. 4, there is shown a second embodiment of a rotor segment 124. Here, each rotor segment 124 is still a substantially, inverted U-shaped frame member having a top wall 138 and opposing sidewalls 136. Additionally, each rotor segment 124 further includes an upwardly projecting, hollow protrusion 140 formed in the top wall 138 which defines a slot 142. The slot 142 accommodates an upper radial calibration guide 186, as described below.

II. Stator

Referring again to FIGS. 11, 12, and 18, as shown, the segmented stator ring 62 houses the plurality of stator induction modules 64. Each stator induction module 66, generally, comprises a plurality of coils 68 to be mounted within the stator ring 62 and situated within the rotor channel 44 between the opposing magnets 34 of the magnet modules 26 (FIG. 2).

1. Coils

Figure 6:
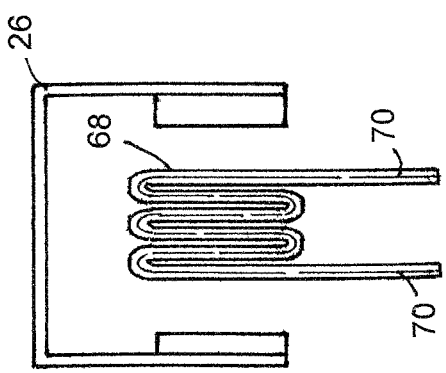
FIG. 6 is a front view of the first embodiment of the coil situated within a dual air gap provided in an associated magnet module.
Figure 5:
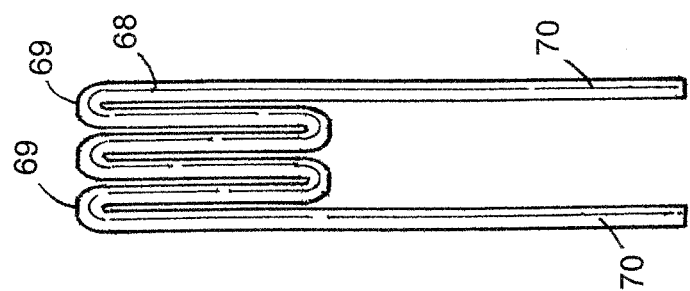
FIG. 5 is a front view of a first embodiment of a coil of a stator induction module in accordance herewith.

In FIGS. 5 and 6, there is depicted a first embodiment of the coils 68, which are deployed in what is denoted as a "slot-less" design. The coils 68 in this first embodiment are formed from a conductive material, typically copper, and include at least one, and, preferably, a plurality of turns 69. Each coil 68 has leads 70 at opposite ends of the coil 68. The leads 70 projecting from the coil 68 are strands and flexible in order to accommodate radial motion, as the stator induction module 66 floats radially, to maintain dimensional control of the dual air gaps between the coil 68 and opposing magnets 34.

Figure 8:
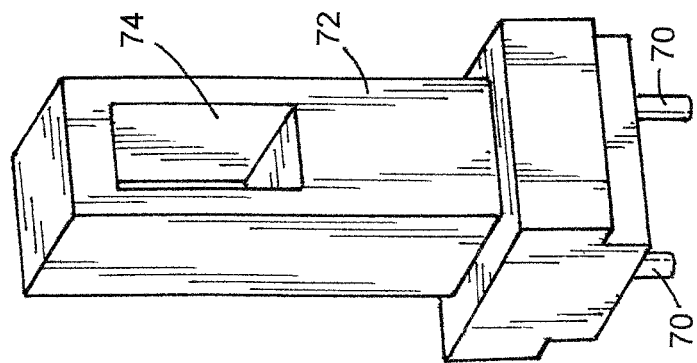
FIG. 8 is a perspective view of the first embodiment of the coil fully encapsulated.
Figure 7:
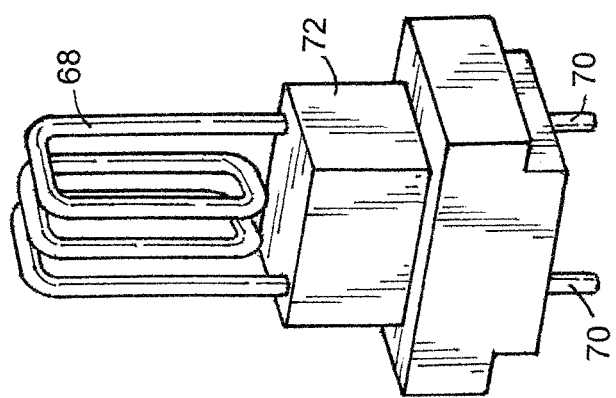
FIG. 7 is a perspective view of the first embodiment of the coil partially encapsulated in a thermally conductive molded polymer.

As shown in FIGS. 7 and 8, each coil 68 may be partially encapsulated or fully encapsulated, respectively, with a thermally, non-electrically conductive molded polymer 72. The molded polymer 72 imparts a rigid structure and is configured for attaching the coil 68 to the stator segments 64, discussed below, and for fixedly positioning the stator segments 64 in an X, Y, and Z plane operating position relative to that of the rotor 20.

Additionally, full encapsulation protects each coil 68 from operational and/or environmental contamination. A void 74 is formed in the center of the encapsulated coil 68 and the molded polymer 72 to provide weight reduction. The coils 68 can be encapsulated by any suitable technique known to the skilled artisan.

Since heat is generated in the coil 68 in an amount proportional to the current passing through a conductor multiplied by its resistance ($I^2R$), the molded polymer 72, at least partially encapsulating the coils 68, serves as a thermal link to both the stator segments 64 and the surrounding ambient air.

Figure 10:
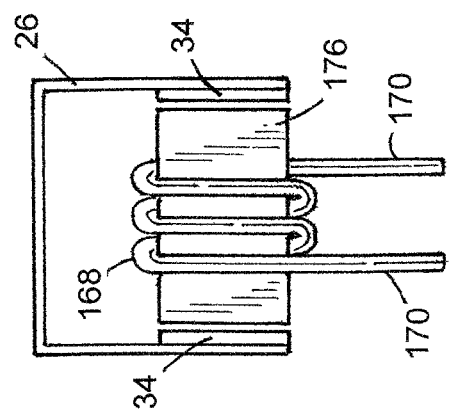
FIG. 10 is a front view of the second embodiment of the coil positioned within the dual air gap provided in an associated magnet module hereof.
Figure 9:
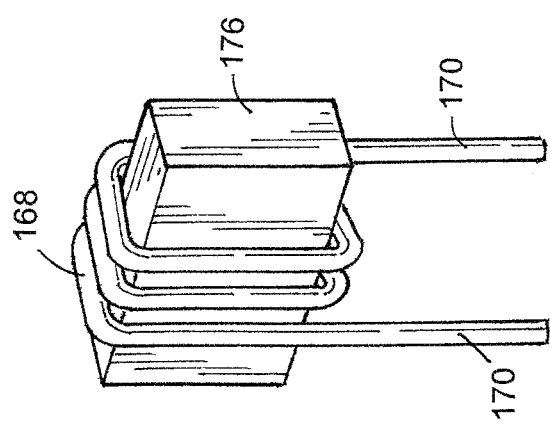
FIG. 9 is a perspective view of a second embodiment of the coil encircling a laminated stack of a magnetically permeable metal.

In an alternative or second embodiment of the coils, a coil 168 is shown in FIGS. 9 and 10. This embodiment alleviates the negative effects of the large dual air gap as exhibited between the aforementioned coils 68 and the magnet modules 26. In this second embodiment, referred to as a "slotted" design, the coil 168 differentiates from the first embodiment of the coil 68 discussed above by providing a stack of soft magnetic material laminations 176. The lamination stack 176 is a magnetically permeable material such as a silicon steel.

The coil 168 is wound around the lamination stack 176 which serves to direct and concentrate the flux path of the magnetic circuit. The large dual air gap present in the "slot-less" design is significantly reduced by the presence of the lamination stack 176 and almost completely bridges the dual air gap between the two magnets 34. This second embodiment of the coils 168 also dramatically increases the power density and efficiency of the present invention by reducing the total air gap that restricts the magnetic flux in the magnetic circuit. The total air gap in this second embodiment is limited to only the sum of the gaps present at either end of the lamination stack 176.

Similar to that of the first embodiment of the coil 68, the second embodiment of the coils 168 may also be either partially or fully encapsulated by the molded polymer. 72

2. Stator Induction Modules

Referring now to FIGS. 11 and 12, there is shown a first embodiment of the stator induction module 66 positioned or nested within the rotor channel 44. Here, the stator induction module 66 is an integrally formed structure comprising the coil 68 and the molded polymer 72, which either partially encapsulates (FIG. 11) or fully encapsulates (FIG. 12) the coil 68. As noted above, this first embodiment of the stator induction module 66 may employ either the first or second embodiment of the coil 68 or 168.

Referring now to FIGS. 13-16, a preferred, second embodiment of a stator induction module 166 is shown in combination with the second coil embodiment 168, which employs the lamination stack 176. Here, the stator induction module 166 includes a lower radial calibration guide 180 and a lower radial calibration guide carrier 182 to impart self-calibration with respect to the rotor 20. This maintains a constant dual air gap by maintaining its position within the rotor channel 44.

In this second embodiment, the stator induction modules 166 are shown as being fully encapsulated, but it is to be understood that they may also be only partially encapsulated.

A molded polymer 172 encapsulates the coil 168 and includes an elongated radial key 178 extending downwardly from the bottom of the molded polymer 172. The lower radial guide 180 is provided above the radial key 178, disposed circumferentially around the molded polymer 172.

A plurality of calibration rollers 184 is rotatably disposed on the lower radial calibration guide 180 and, optionally, an upper radial calibration guide 186, discussed below. The size, quantity, and material from which the calibration rollers 184 are made is dependent upon and will vary as a function of the specific application.

A lower radial guide carrier 176 provides a frame for the lower radial guide 180 and the molded polymer 172 to be securely seated within an associated stator segment 24, as described below. The lower radial guide carrier 176 includes a slot 188 laterally formed therein for slidably mating with and removably accepting the radial key 178. In order to position the molded polymer 172 within the lower radial guide 180, the radial key 178 is seated in the lower radial calibration guide carrier 182 for guiding the stator induction module 166 in the radial direction while within the rotor channel 44.

A pair of openings 190 are provided through the radial calibration guide carrier 176. A pair of leads 170 of the coil 168 extend through the openings 190 for connecting to a bus bar 90, 92, as discussed below.

As noted above, the second embodiment of the stator induction module 166 may also include an upper radial calibration guide 186 which removably mates within the slots 142 provided in the second embodiment of each rotor segment 124 (FIG. 4).

Both the lower radial calibration guide 180 and the upper radial calibration guide 186 are separate components from the molded polymer 172 and may be made from any suitable non-conductive, self-lubricating, polymeric material such as that sold under the trademark Teflon®, Medlen®, or the like.

3. Stator Segments

As noted above, the stator ring 62 comprises a plurality of stator segments 64 similar to that of the rotor segments 24.

Figure 17:
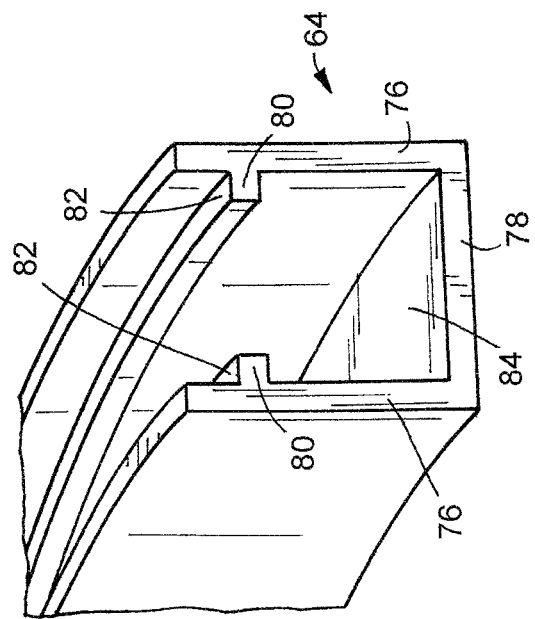
FIG. 17 is a partial perspective view of a stator frame in accordance herewith.
Figure 16:
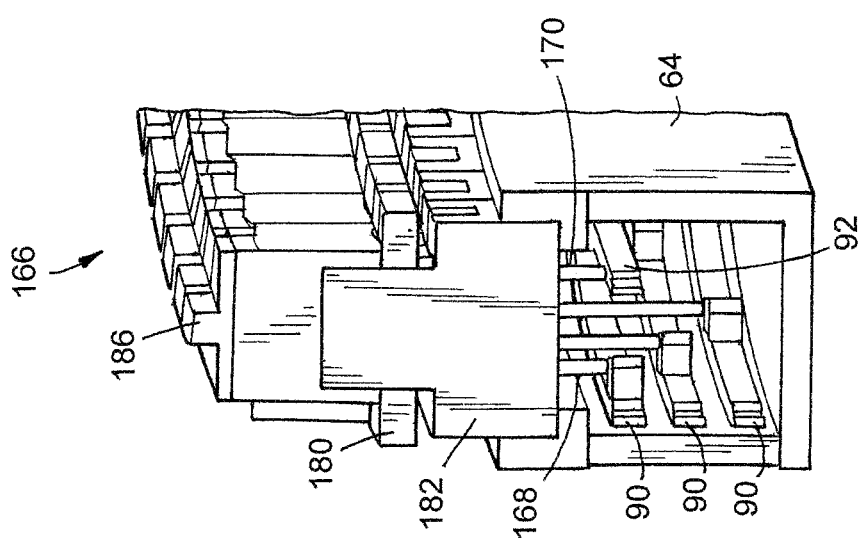
FIG. 16 is a partial perspective view of the second embodiment of the stator induction module of FIG. 15 positioned within a stator segment and the coil connected to a plurality of bus bars.

As shown in FIG. 17, each stator segment 64 is a substantially U-shaped frame member having a bottom wall 78, a pair of opposed sidewalls 76 extending upwardly from the bottom wall 78, and a pair of ledges 80 extending laterally inwardly from the opposed sidewalls 76. The pair of ledges 80 cooperate to define a seat 82 for the stator induction modules 66 or 166 to be positioned thereupon. Throughout the ensuing description, reference will be made to the stator segment 64 being used in combination with the second embodiment of the stator induction module 166, but it is to be understood that the first embodiment of the stator induction module 66 may similarly be seated thereon.

The sidewalls 76 and the bottom wall 78 of the stator segment 64 define an interior stator channel 84. The lower radial calibration guide carrier 182 is stationarily seated on the opposing ledges 80 within the stator channel 84. As noted above, the stator segments 64, through direct contact, act as a heat sink to dissipate the heat generated in the coils 168.

It should be noted that the number of stator induction modules 166 mounted in each stator segment 64 is determined by the width of the individual stator induction module 166 and the desired circumferential length of each stator segment 64 that forms the motor/generator 10 hereof. A typical stator segment 64 encompasses an array of individual stator induction modules 166.

As shown in FIG. 18, there is provided, at each end of the stator segments 64, a window 86 which allows access to terminal ends 93 of a plurality of bus bars 90, 92, as described below. Additionally, a plurality of fasteners 88 permit each stator segment 64 to be mechanically connected together. The fasteners 88 may also be used to mount the individual stator segments 64 to a base or floor.

III. Bus Bars

Referring, again, to FIG. 16, a plurality of bus bars, including a plurality of phase bus bars 90 and at least one common bus bar 92, is disposed within the stator channel 84. The plurality of bus bars 90, 92 within each stator segment are disposed within into the stator channel 84 with their ends dammed off. They are then secured in place by surrounding and encapsulating them with a high density polyurethane foam or the like injected into the stator channel 84.

The bus bars 90, 92 are individually connected to their adjacent counterpart within an abutting stator segment 64 to provide a complete electrical circuit. Respective leads 170 of the coil 168 are connected to associated phase bus bars 90 and one to the common bus bar 92.

The number of phase bus bars 90 and type of electrical connection of the final assembly is optional and is determined by the way in which the individual stator induction modules 166 are connected.

As shown, a single common bus bar 92 is provided for each stator induction module 166 and one additional phase bus bar 90 for each separate phase. In this arrangement, the stator induction modules 166 are electrically connected to the bus bars in a three phase "Y" configuration.

It should be understood that both the stator segments 64 and bus bars 90, 92 remain unchanged regardless of which embodiment of the rotor segments 24, 124, coils 68, 168, and stator induction modules 66, 166 are utilized.

IV. Wind Turbine

As noted above, the present motor/generator 10 can function as either a motor or a generator.

When functioning as a motor, electricity is supplied to the motor/generator 10 which generates an electrical induction that operates on opposing poles of the magnet modules 26. This electrical induction generates an electromagnetic field that is tangent to the rotor 20 which produces torque on the rotor 20 and causes the rotor 20 to turn. Thereafter, the rotor 20 rotates a tool or machinery operably connected thereto.

As a generator, the rotor 20 rotates in the same manner as described above, thereby creating electricity via the stator induction modules 66. Electricity is drawn through the bus bars 90, 92 connected to the leads 70 of the coils 68, thus forming a completed electrical circuit. The electrical circuit ends at the plurality of terminal pins 93 of the bus bars 90, 92 which are provided to receive and connect to an electronic motor controller or other mechanical mechanism (not shown) to facilitate commutation and control the direction and speed of the motor/generator 10.

FIG. 19 shows the motor/generator 10 of the present invention functioning as a generator by being incorporated into a wind turbine rotor 94. As shown, the large diameter BLPMDC generator 10 is rotatably coupled by mechanically fastening or welding it to a wind turbine rotor 94 in a direct drive application. In the example shown, a plurality of turbine rollers 96 rotatably support the wind turbine rotor 94 for rotation. The rotor 20 rotates with the wind turbine rotor 94. The stator 60 is attached to and positioned by support brackets 98 to a turbine guide rail 99. This establishes and dimensionally secures the relationship with the rotating rotor ring 22 and the fixed stator ring 62. The support brackets 98 maintain the critical relationship between the rotor 20 and stator 60 while allowing the wind turbine rotor 94 to freely rotate on its axis.

This arrangement reduces significantly the capital cost, maintenance, and complexity of a wind turbine system by eliminating the need for a central shaft, a gearbox, and all of the associated ancillary support components (i.e. supports, couplings, etc.).

The quantity and length of each individual rotor segment 24 and stator segment 64 is determined by the overall diameter of the assembly and the maximum size that can conveniently be shipped in kit form to a remote location for subsequent assembly on site. By using segmented rotor rings 22 and stator rings 62, a very large diameter structure can be assembled, easily transmitted to a remote job site where it will be assembled and installed in its final form.

V. New Assembly

Referring now to FIGS. 20-24, and in accordance with a further embodiment, a combined rotor and stator assembly, generally, denoted at 210 comprises a circular rotor 211 and a stator 218. The rotor 211 includes a plurality of rotor segments 213 (only one of which is shown), which, when assembled, together form the completed rotor 211, similar to the above discussed embodiments.

Here, the rotor segment 213 includes, generally, a rotor frame 214 and a plurality of magnets 212 disposed therein.

Figure 20:
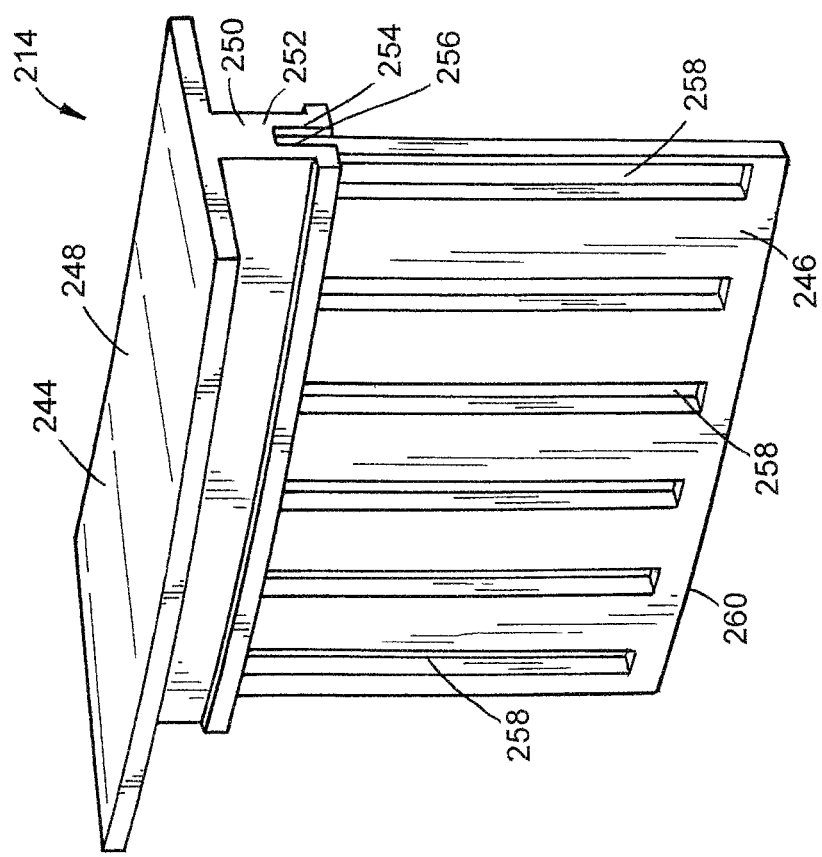
FIG. 20 is a partial perspective view of an alternative embodiment of the rotor frame.
Figure 22:
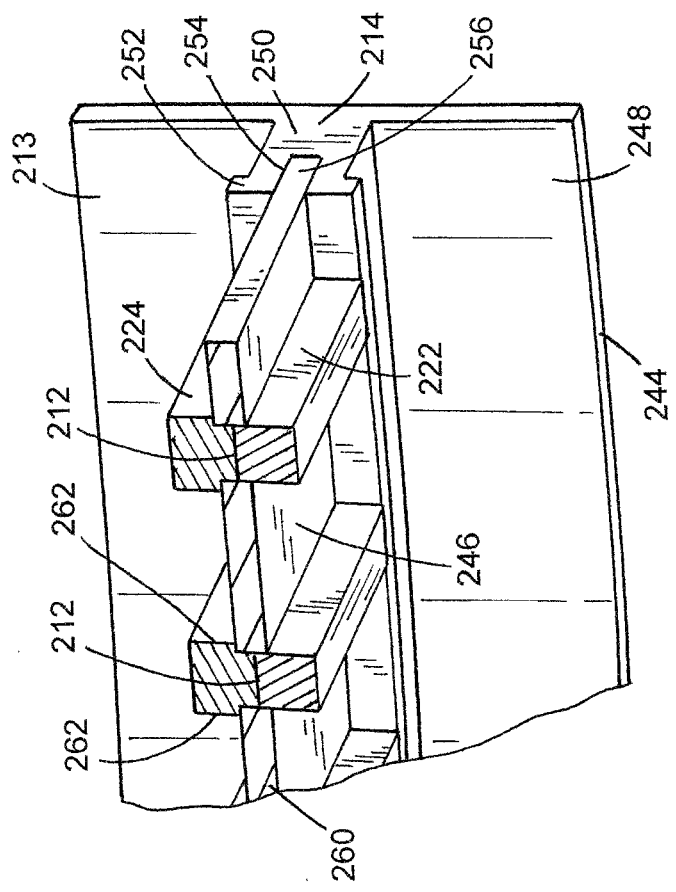
FIG. 22 is a perspective view of the magnets disposed within the rotor frame of FIG. 20.
Figure 21:
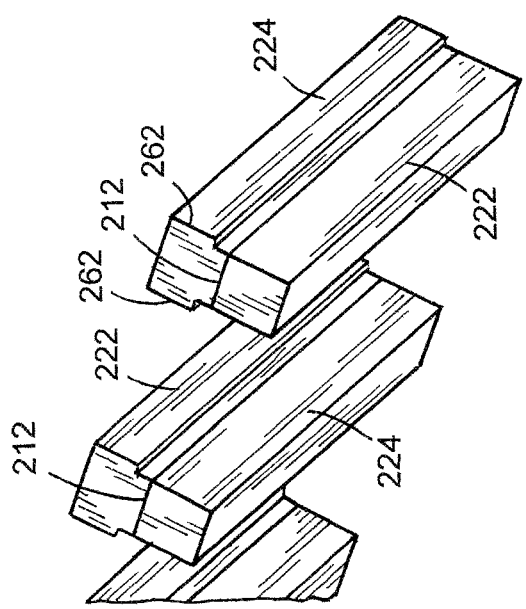
FIG. 21 is a perspective view of a plurality of magnets in accordance with this alternative embodiment.

As shown in FIG. 20, the rotor frame 214, preferably, is formed from a lightweight metal, such as aluminum, to which the plurality of magnet 212 are attached, as described below. The rotor frame 214 comprises a two-part assembly including a rail 244 and a retainer 246.

More particularly, the rail 244 is a substantially T-shaped member having a flat plate 248 and a downwardly depending member or leg 250 integrally formed therewith and extending from a substantially medial portion of the plate 248. The leg 250 has a lower end 252 and a slit 254 formed therein.

The retainer 246, itself, is a substantially planar plate having a plurality of longitudinal slots 258. The slots 258 are dimensioned to stably seat an associated magnet 212. The retainer 246 has a lower surface 260 and the upper lip 256 which projects into and seats within the slit 254 in order to position the retain 246 therein. The retainer 246 may be further secured to the plate by welding, mechanical attachments, or the like. Alternatively, the rail 244 and the retainer 246 may be integrally formed.

Each magnet 212 is an elongated magnet comprising a North and South pole 222, 224, respectively. In practicing this embodiment, the magnets 212 may be neodymium magnets, bonded neodymium magnets, ceramic magnets, and the like.

Each magnet 212 includes a cutout section provided on at least one side of the magnet 212. The cutout section defines a protruding shoulder 262 which abuts against a longitudinal edge of an associated slot 258. The shoulder 262 prevents outward movement of the magnet 212 and the magnet 212 from becoming displaced from the slot 258 created by centrifugal force as the rotor 211 rotates.

Each magnet 212 is disposed within an associated slot 258 of the rotor frame 214 and arrayed in alternating magnetic polarity. Additionally, the magnets 212 are further secured within each slot 258 by any suitable means such as gluing or the like.

Figure 24:
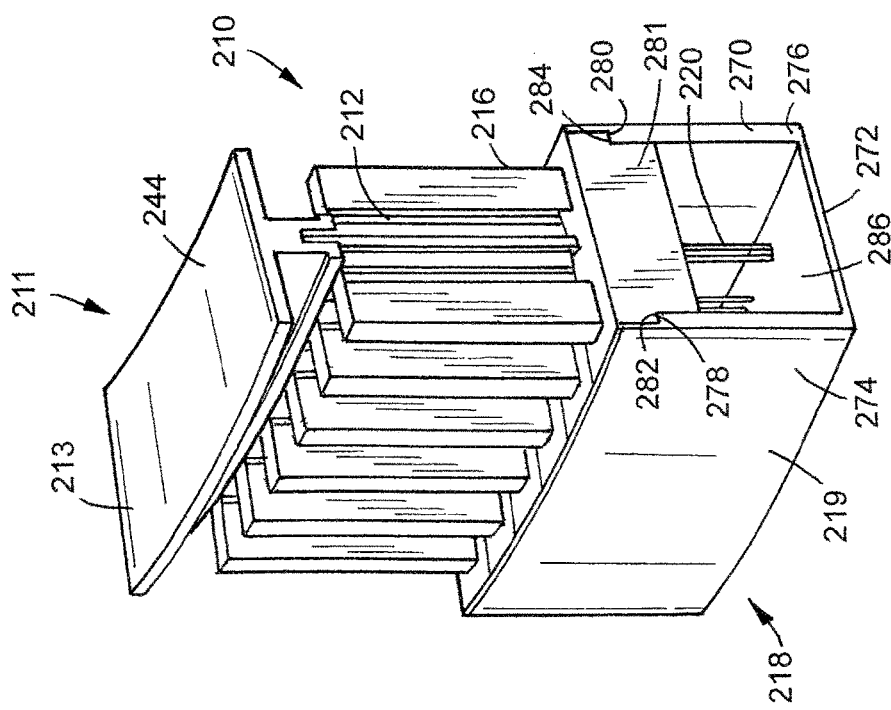
FIG. 24 is a partial perspective view of the combined rotor and stator in accordance with this alternative embodiment.
Figure 23:
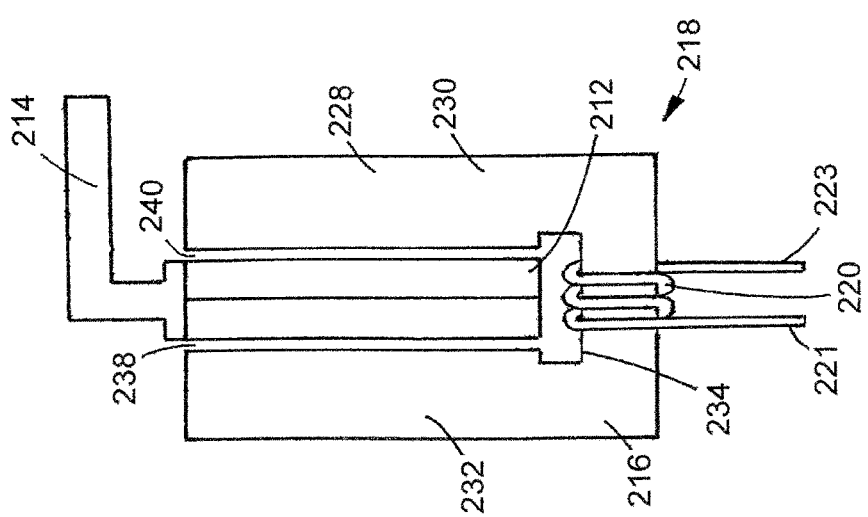
FIG. 23 is a front plan view of the magnets positioned between a stator in accordance herewith.

With reference to FIGS. 23 and 24, the stator 218 comprises a plurality of stator segments 219 (only one of which is shown), which, when assembled, form the completed stator 218, similar to that discussed in the above embodiments.

Each stator segment 219 comprises a stator frame 270, a coil 220, and a magnetic permeable member 216.

The stator frame 270 comprises a non-magnetic material having a bottom or base 272 and a pair of opposed upstanding sidewalls 274, 276 integrally formed with the base 272. A pair of opposed shoulders 278, 280 are provided extending inwardly from the sidewalls 274, 276, respectively. The stator frame 270 includes an open channel 286 defined by the pair of sidewalls 274, 276 and the interconnecting base 272.

Each magnetic permeable member 216 of the stator segment 219, generally, comprises a substantially inverted U-shaped member 228 having a bight section 234, and a first and a second leg 230, 232 extending upwardly from opposite ends of the bight section 234.

The magnetically permeable element 216 substantially envelops or circumscribes the sides and the bottom of the magnet 212.

Each magnetically permeable element 216, preferably, is formed from a magnetic permeable material such as silicon steel and comprises a lamination stack in the same manner as described hereinabove. It is to be understood that the magnetically permeable element 216 may be partially encapsulated as at 281 with the same polymeric material as described above.

The molded polymer 281 at least partially encapsulates the coils 220 and the magnetic permeable element 234. The molded polymer 281 includes abutments 282, 284 which seat against the shoulders 278, 280, respectively.

The coil 220 is wound around the bight section 234 of the magnetically permeable element 216 and extends downwardly to ends 221, 223. The ends 221, 223 of the coils 220 are connected to a plurality of bus bars (not shown), similar to the plurality of bus bars described in the above embodiments, and disposed within the open channel 286 of the stator frame.

In use, the rotor frame 214 and associated magnets 212 are disposed in the space between the legs 230, 232 of the magnetically permeable element 216 and pass over the coils 220 in the same manner as described hereinabove.

As shown, specifically in FIG. 23, this embodiment provides an assembly having dual gaps 238, 240 between each magnet 212 and the magnetically permeable element 216.

Here, according to the embodiment, the majority of the weight of the rotating mass of the rotor 211 is transferred to the stator 218.

LIST OF REFERENCE NUMERALS

10 Motor/generator
20 Rotor
22 Rotor ring
24 Rotor segment (first embodiment)
26 Magnet module
28 Metal band
30 Legs
32 Interconnecting bight section
34 Magnets
36 Sidewalls of rotor segment (first embodiment)
38 Top wall of rotor segment (first embodiment)
44 Rotor channel
60 Stator
62 Stator ring
64 Stator segment
66 Stator induction module (first embodiment)
68 Coil (first embodiment)
69 Coil turns
70 Leads of coil (first embodiment)
72 Molded polymer (first embodiment)
74 Void of molded polymer (first embodiment)
76 Sidewalls of stator segment
78 Bottom wall of stator segment
80 Ledges of stator segment
82 Seat of stator segment
84 Stator channel
86 Window of stator segment
88 Fasteners of stator segment
90 Phase bus bars
92 Common bus bar
93 Terminal pins
94 Wind turbine rotor
96 Turbine rollers
98 Support brackets
99 Turbine guide rail
124 Rotor segment (second embodiment)
136 Sidewalls of rotor segment (second embodiment)
138 Top wall of rotor segment (second embodiment)
140 Protrusion of rotor segment (second embodiment)
142 Slot of rotor segment (second embodiment)
166 Stator induction module (second embodiment)
168 Coil (second embodiment)
170 Leads of coil (second embodiment)
172 Molded polymer (second embodiment)
176 Lamination stack (second embodiment)
178 Radial key of stator induction module (second embodiment)
180 Lower radial calibration guide of stator induction module (second embodiment)
182 Lower radial calibration guide carrier (second embodiment)
184 Calibration rollers of stator induction module (second embodiment)
186 Upper radial calibration guide of stator induction module (second embodiment)
188 Slot of lower radial calibration guide carrier (second embodiment)
190 Openings in lower radial calibration guide carrier (second embodiment)
210 Combined rotor and stator assembly (new embodiment)
211 Rotor
212 Magnet
213 Rotor segments
214 Rotor frame
216 Magnetically permeable element
218 Stator
219 Stator segments
220 Coil
221 End of coil
222 North pole
223 End of coil
224 South pole
228 U-shaped member
230 Leg of magnetically permeable element
232 Leg of magnetically permeable element
234 Bight section of magnetically permeable element
238 Dual gap
240 Dual gap
244 Rail of rotor frame
246 Retainer of rotor frame
248 Flat plate of rotor frame
250 Leg of rotor frame
252 Lower end of leg of rotor frame
254 Slit of rotor frame
256 Lip of retainer
258 Slot
260 Lower surface of plate
262 Shoulder of magnet
270 Stator frame
272 Base of stator frame
274 Sidewall of stator frame
276 Sidewall of stator frame
278 Shoulder of sidewall of stator frame
280 Shoulder of sidewall of stator frame
281 Molded polymer
282 Abutments of molded polymer
284 Abutments of molded polymer
286 Open channel of stator frame

Having thus described the invention, what is claimed is:

1. A motor/generator comprising:
   (a) a rotor including a plurality of rotor segments, the plurality of rotor segments being operatively connected at opposite ends thereof to form a circular rotor ring, each one of the plurality of rotor segments including:
      (i) a rotor frame having a top wall and a pair of opposed sidewalls extending downwardly from and substantially perpendicular to opposite ends of the top wall, the top wall and the sidewalls defining a rotor channel;
      (ii) a plurality of magnet modules arranged in alternating magnetic polarity, each one of the plurality of magnet modules including a metal band having a bight section, and a pair of opposing legs extending downwardly from and substantially perpendicular to opposite ends of the bight section, a pair of inwardly facing magnets being disposed on respective legs and positioned within the rotor channel;
   (b) a stator including a plurality of stator segments, the plurality of stator segments being operatively connected at opposite ends thereof to form a circular stator ring, each one of the plurality of stator segments including:
      (i) a stator frame including a base and a pair of opposed sidewalls extending upwardly from and substantially perpendicular to opposite ends of the base, the base and the pair of sidewalls defining a stator channel, a pair of shoulders extending inwardly from respective sidewalls;

(ii) a plurality of bus bars disposed within the stator channel, the plurality of bus bars including a plurality of phase bus bars and at least one common bus bar;

(iii) a plurality of stator induction modules being seated on the shoulder of the stator frame, each one of the plurality of stator induction modules including:

(1) a coil having leads extending from opposite ends thereof and at least one turn formed therebetween, respective leads being in electrical communication with one of the plurality of phase bus bars and the common bus bar;

(2) a molded polymer formed from a thermally, non-electrically conductive polymer, the molded polymer at least partially encapsulating the coil; and wherein the rotor rotates above the stator such that the plurality of magnet modules encircles the stator induction modules and provides a dual air gap between the coils and the opposing magnets.

2. The motor/generator of claim 1 further comprising:

(a) a plurality of lamination stacks, each one of the lamination stacks being disposed within and encircled by the at least one turn of a respective coil, the plurality of lamination stacks being formed from a magnetically permeable material, thereby reducing the dual air gap between the coils and the opposing magnets.

3. The motor/generator of claim 1 wherein each coil is fully encapsulated by a respective molded polymer, the molded polymer having a top surface and a bottom surface.

4. The motor/generator of claim 3 wherein the stator further comprises:

(a) an upwardly projecting, hollow protrusion formed in the top wall of the stator frame, the protrusion defining a slot formed therein.

5. The motor/generator of claim 4 wherein each one of the plurality of stator induction modules further comprises:

(a) an upper radial calibration guide secured to the top surface of the molded polymer, the upper radial calibration guide slidably mating within the slot formed in the top wall of the stator frame;

(b) a lower radial calibration guide disposed circumferentially around the molded polymer;

(c) an elongated radial key extending downwardly from the bottom surface of the molded polymer; and (d) a lower radial calibration guide carrier having a lateral slot formed therein for accepting the radial key of the molded polymer and supporting the molded polymer, the lower radial calibration guide carrier being seated on the pair of shoulders of the stator frame, the leads of the coil extending through the lower radial calibration guide carrier.

6. The motor/generator of claim 5 wherein the upper radial calibration guide and the lower radial calibration guide further comprise:

(a) at least a pair of calibration rollers disposed on each of the upper and lower radial calibration guides; and wherein the at least a pair of calibration rollers on the upper and lower radial calibration guides impart self-calibration with respect to the rotor.

7. The motor/generator of claim 1 wherein each one of the plurality of stator segments further comprises:

(a) a window formed in the stator frame for providing access to the plurality of bus bars.

8. The motor/generator of claim 1 further comprising:

(a) a wind turbine rotor mechanically connected to the rotor in a direct drive application; and wherein the rotor and wind turbine rotor rotate simultaneously while the stator remains stationary.

9. The motor/generator of claim 8 further comprising:

(a) a plurality of turbine rollers secured to the wind turbine rotor;

(b) a circular turbine guide rail for stabilizing the plurality of turbine rollers and rotation of the wind turbine rotor; and (c) a plurality of support brackets securing the stator to the guide rail to ensure the stator remains stationary while the rotor and the wind turbine rotor rotate.

10. A motor/generator comprising:

(a) a rotor including a plurality of rotor segments, the plurality of rotor segments being operatively connected at opposite ends thereof to form a circular rotor ring, each one of the plurality of rotor segments including:

(i) a substantially T-shaped rotor frame having a plurality of longitudinal slots formed therein;

(ii) a plurality of magnets arranged in alternating magnetic polarity, each one of the plurality of magnets disposed within a respective one of the plurality of longitudinal slots;

(b) a stator including a plurality of stator segments, the plurality of stator segments being operatively connected at opposite ends thereof to form a circular stator ring, each one of the plurality of stator segments including:

(i) a stator frame including a base and a pair of opposed sidewalls extending upwardly from and substantially perpendicular to opposite ends of the base, the base and the pair of sidewalls defining a stator channel, a pair of shoulders extending inwardly from respective sidewalls;

(ii) a plurality of bus bars disposed within the stator channel, the plurality of bus bars including a plurality of phase bus bars and at least one common bus bar;

(iii) a plurality of stator induction modules being seated on the shoulder of the stator frame, each one of the plurality of stator induction modules including:

(1) a coil having leads extending from opposite ends thereof and at least one turn formed therebetween, respective leads being in electrical communication with one of the plurality of phase bus bars and the common bus bar;

(2) a lamination stack formed from a magnetically permeable material, the lamination stack having a bight section encircled by the coil and a pair of opposing legs extending upwardly from and substantially perpendicular to opposite ends of the bight section;

(3) a molded polymer formed from a thermally, non-electrically conductive polymer, the molded polymer at least partially encapsulating the coil and the lamination stack; and wherein the rotor rotates above the stator such that the lamination stack of each stator induction module extends parallel to a respective magnet and provides a dual air gap between the lamination stacks and the respective magnet.

11. The motor/generator of claim 10 wherein the rotor frame is a two-piece assembly comprising a rail and a retainer, (a) the rail including a flat plate and a downwardly depending leg integrally formed therewith, the leg having a lower end opposite the plate and a slit formed therein for accepting the retainer; and (b) the retainer including a substantially planar plate having a plurality of longitudinal slots formed therein for accepting a respective one of the plurality of magnets, the retainer further including an upper lip which projects into and is secured within the slit in the rail.

12. The motor/generator of claim 10 wherein each one of the plurality of magnets includes a protruding shoulder formed on at least one side of the magnet for preventing displacement of the magnets within a respective longitudinal slot caused by centrifugal force as the rotor rotates.

13. A wind turbine comprising:
(a) a wind turbine rotor;
(b) a rotor mechanically connected to the rotor in a direct drive application, the rotor including a plurality of rotor segments, the plurality of rotor segments being operatively connected at opposite ends thereof to form a circular rotor ring, each one of the plurality of rotor segments including:
  (i) a rotor frame having a top wall and a pair of opposed sidewalls extending downwardly from and substantially perpendicular to opposite ends of the top wall, the top wall and the sidewalls defining a rotor channel;
  (ii) a plurality of magnet modules arranged in alternating magnetic polarity, each one of the plurality of magnet modules including a metal band having a bight section, and a pair of opposing legs extending downwardly from and substantially perpendicular to opposite ends of the bight section, a pair of inwardly facing magnets being disposed on respective legs and positioned within the rotor channel;
(c) a stator including a plurality of stator segments, the plurality of stator segments being operatively connected at opposite ends thereof to form a circular stator ring, each one of the plurality of stator segments including:
  (i) a stator frame including a base and a pair of opposed sidewalls extending upwardly from and substantially perpendicular to opposite ends of the base, the base and the pair of sidewalls defining a stator channel, a pair of shoulders extending inwardly from respective sidewalls;
  (ii) a plurality of bus bars disposed within the stator channel, the plurality of bus bars including a plurality of phase bus bars and at least one common bus bar;
  (iii) a plurality of stator induction modules being seated on the shoulder of the stator frame, each one of the plurality of stator induction modules including:
    (1) a coil having leads extending from opposite ends thereof and at least one turn formed therebetween, respective leads being in electrical communication with one of the plurality of phase bus bars and the common bus bar;
    (2) a molded polymer formed from a thermally, non-electrically conductive polymer, the molded polymer at least partially encapsulating the coil;
wherein the rotor rotates above the stator such that the plurality of magnet modules encircles the stator induction modules and provides a dual air gap between the coils and the opposing magnets; and
further wherein the rotor and the wind turbine rotor rotate simultaneously while the stator remains stationary.

14. The wind turbine of claim 13 further comprising:
(a) a plurality of turbine rollers secured to the wind turbine rotor;
(b) a circular turbine guide rail for stabilizing the plurality of turbine rollers and rotation of the wind turbine rotor; and
(c) a plurality of support brackets securing the stator to the guide rail to ensure the stator remains stationary while the rotor and the wind turbine rotor rotate.

15. In a motor/generator of the type having a plurality of motor segments and stator segments where the motor segments and stator segments form a circular motor/generator, the improvement comprising:
a plurality of magnet modules arranged in alternating magnetic polarity, each one of the plurality of magnet modules including a metal band having a bight section and a pair of opposing legs extending downwardly from a substantially perpendicular the opposite ends of the bight section; and
a stator frame further including a pair of shoulders extending inwardly from respective sidewalls; the stator frame including a base and a pair of opposed sidewalls extending upwardly from and substantially perpendicular to opposite ends of the base, the base and the sidewalls defining a stator channel.

* * * * *